June 8, 1943.  C. C. WATERBURY  2,321,340
RUBBER ARTICLE AND METHOD OF MAKING SAME
Filed April 9, 1941
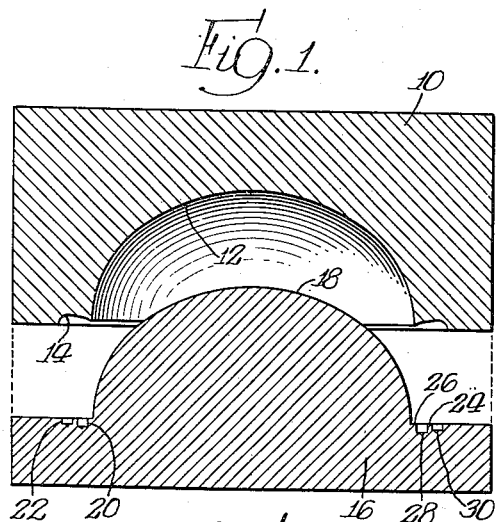
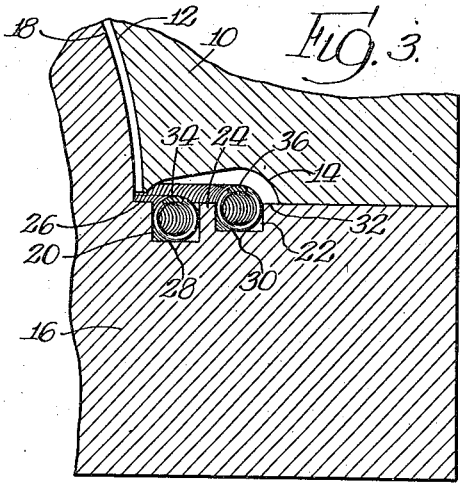
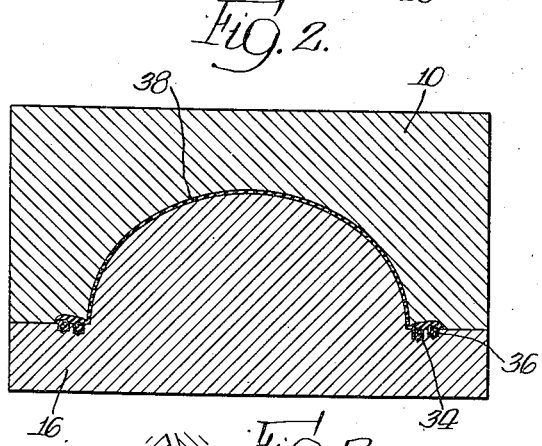
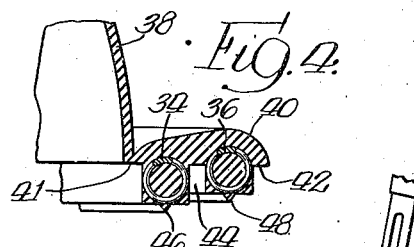
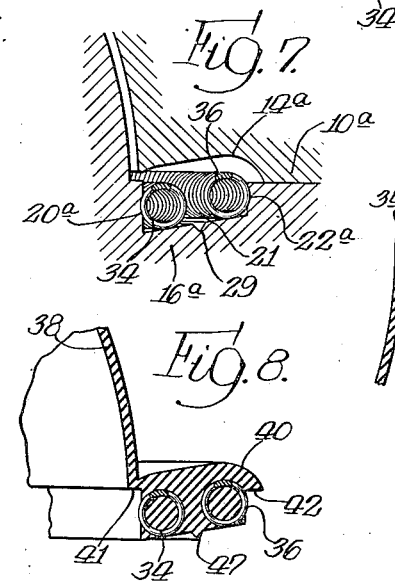
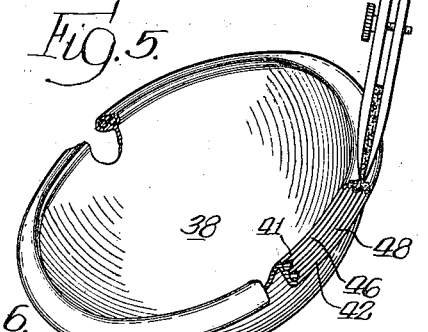
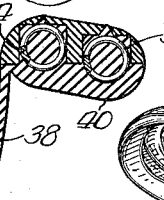
INVENTOR.
Carl C. Waterbury
BY Bair & Freeman
Atty's.

Patented June 8, 1943

2,321,340

UNITED STATES PATENT OFFICE 2,321,340

RUBBER ARTICLE AND METHOD OF MAKING SAME

Carl C. Waterbury, Chicago, Ill.

Application April 9, 1941, Serial No. 387,615

14 Claims. (Cl. 18—42)

My invention relates to an improvement in rubber articles and in the method and apparatus for making them.

The method which I have devised is particularly applicable in the manufacture of pessaries or diaphragms where it is desired to have a coil spring or other resilient metal member embedded in the periphery of the device.

It has been found desirable to make devices of this kind with two concentric annular spiral springs, and it is an object of my invention to provide a way of molding these springs in the periphery of the diaphragm with assurance that the springs will be properly located with respect to each other.

Diaphragms with a single peripheral spring are well known, and have ordinarily been made in a two-piece mold, the peripheral spring being laid in an annular groove in the lower mold member before the mold is filled with rubber. Because the spring lies on the bottom of the groove, one side of it has little or no covering of rubber when the product is removed from the mold, and it is necessary to apply a further coating of rubber along this side. Patent No. 2,111,313, for example, shows one of the methods for applying this coating. It is an object of my invention, however, to provide a more practical, speedy and economical way of coating the spring than has previously been used.

Another object is to provide a freely flexible diaphragm which will bend consistently in a desired way when its opposite edges are pressed together. This object is achieved by using two concentric springs in the periphery, the planes of the two springs being somewhat offset.

With these and other objects in view, my invention consists in the details of procedure involved in the practice of my method, and in the construction and arrangement of the parts of the apparatus for carrying out my method and of the devices produced by my method, whereby the objects contemplated are achieved, as hereinafter more fully set forth, pointed out in my claims and illustrated in the accompanying drawing, in which:

Figure 1 is a cross sectional view of the elements of the mold, shown spaced apart.

Figure 2 is a view similar to Figure 1, but showing the mold elements in closed position, and filled with rubber;

Figure 3 is an enlarged fragmentary view of a portion of Figure 2, the rubber being omitted;

Figure 4 is a fragmentary cross sectional view of a portion of the product as taken from the mold;

Figure 5 illustrates the last step in completing the device;

Figure 6 is an enlarged view of the completed rim of the device;

Figure 7 is a view similar to Figure 3 illustrating a modified form of mold;

Figure 8 is a fragmentary cross sectional view of a portion of the product as taken from the mold of Figure 7, and Figure 9 is a perspective view, showing the manner in which the device folds when pinched together.

In the drawing I have used the reference numeral 10 to indicate the top member of the mold, having a cavity 12 and an annular groove 14. The cooperating lower mold member 16 has a central upstanding dome portion 18, surrounded by two concentric annular grooves 20 and 22, which are separated by a thin partition rib 24. The base of the dome portion 18 is offset slightly from the groove 20, leaving a shoulder 26. Along the middle of the bottom of groove 20 I form a small V-shaped channel 28; a similar channel 30 is provided in the bottom of the groove 22.

The groove 14 in the top mold member 10 is so formed that when the top mold member is centered on the lower one, there will be a shoulder 32 between the outer edge of the groove 14 and the outer edge of the groove 22, as seen in Figure 3.

When the molds are used, an annular coil spring 34 is inserted in the groove 20, and a generally similar spring 36 is inserted in the groove 22. These springs may be alike in cross sectional diameter and size of wire, or they may differ somewhat. I prefer to use a slightly larger wire size and slightly larger coil diameter in the outer spring 36 than in the inner spring 34. In any event, when the sizes are decided upon, the grooves 20 and 22 are so formed that when the springs are firmly in place, a line through their centers, as seen in cross section, will make an acute angle with the plane of the grooves. The outer spring is the higher one, as viewed in the aspect of Figures 1, 2 and 3, and the angle may be of the order of 10°, although considerable variation is possible with springs of different size and stiffness.

After the springs are put in place, the molds are clamped together, as shown in Figure 2, and are then filled with rubber under suitable temperature and pressure, as is well known in the art. The product thus formed is removed from the mold, and consists of a central dome-shaped membrane 38 with a thickened peripheral rim 40 containing the springs 34 and 36. An enlarged cross section of this peripheral rim is shown in Figure 4. In this view one may see the shoulder 41 on the inside edge of the rim, the shoulder 42 on the outside edge, the groove 44 between the springs, and the projecting ribs 46 and 48.

To complete the product, it is inverted from the position shown in Figure 4, and liquid rubber or latex is applied to the unfinished side of the rim 40. This can be easily done by means of an instrument like an ordinary draftsman's ruling pen. The latex flows into the groove 44 and builds up to the tips of the ribs 46 and 48. On the inner and outer edges of the rim, it fills up to the shoulders 41 and 42. By reason of the surface tension, the latex forms a smoothly rounded surface. In Figure 5 the broken portions show parts of the rim before and after being filled with latex. When the latex hardens, the article is complete, a section of the rim being illustrated in Figure 6.

The procedure described gives a diaphragm with a smooth rim, in which two springs are positively located, separated from each other, with the planes of their center lines offset in the manner described.

I have devised also a modified form of mold, shown in Figure 7. The top member of this mold, designated 10a, may be substantially the same as the top mold member 10 shown in Figures 1 and 2. The lower member 16a, however, is somewhat modified, in that it has only a single, relatively wide groove 21. Along the middle of the bottom of groove 21, I make a small V-shaped channel 29. The inner wall of the groove is formed with an annular recess 20a, of arcuate cross section, and the outer wall is formed with a similar recess 22a. The inner spring 34 is formed so that it must be stretched somewhat to slip into the groove 21, and hence it will be retained in the recess 20a by its own tension. The outer spring 36, on the other hand, is formed so that it must be compressed when it is put into the groove, and it is therefore retained in the recess 22a. The recesses are so arranged that the centers of the spring coils, as viewed in cross section, lie on a line at an angle with the plane of the groove 21, just as described in connection with the preferred form. As previously pointed out, an angle of approximately 10° gives good results.

The form of mold shown in Figure 7, therefore, will hold the springs in definite spaced apart position during the molding process, so that a cushion of rubber is formed between them at all points.

The diaphragm made in the molds formed as just described has a rim cross-section which is illustrated in Figure 8. The shoulders 41 and 42 correspond to those similarly numbered in Figure 4. There is a single projecting rib 47 extending around the unfinished side of the rim. The product is finished in the manner previously described, by applying liquid rubber or latex with a ruling pen or similar device, building up the latex to the tip of the rib 47 and to the shoulders 41 and 42.

Latex can be applied very rapidly in the manner described, and the projecting ribs, such as 46 and 48 in the Figure 4 form and 47 in the Figure 8 form, aid the operator in applying the proper amount of latex, so that the product will have the desired smooth contour. The ribs project all around the rim, and the latex is applied until the top of the rib is just reached. The thickness is thus controlled in the mid-portion of the "unfinished" side of the rim, as well as at the shoulders at the edges.

The surface tension of the latex, pulling from the fixed points of the structure represented by the shoulders 41 and 42 and the ribs above mentioned, tends to aid the uniform distribution of liquid across the unfinished side of the rim, and helps to keep it from flowing out of its uniformly distributed relation after it is once applied.

Figure 9 shows how the rim with plural springs bends in the desired way. When the edges of the rim are pressed together, the ends bow upwardly, as indicated in the figure, and this action takes place consistently, which is very desirable in a device of this kind. With diaphragms having a single spring in the rim, the rim may snap into a figure 8, or various other forms, making use difficult and uncertain.

Some changes may be made in the details of procedure involved in the practice of my method, and in the construction and arrangement of the parts of the apparatus for carrying out my method and of the parts of the devices produced by my method, without departing from the real spirit and purpose of my invention, and it is my intention to cover by my claims any variant modes of procedure and any modified forms of structure or use of mechanical equivalents which may be reasonably included within their scope.

I claim as my invention:

1. A mold for rubber articles comprising a member having a dome-shaped central portion, with a plurality of spaced annular grooves of progressively varying depth surrounding said central portion, said grooves being of generally rectangular cross section, and a coacting mold member having an open portion bridging said grooves.

2. In means for molding a product having an annular rim with a pair of annular coiled springs in concentric relation therein, a mold member having a central portion and an annular groove surrounding said central portion, said groove having its inner and outer walls annularly undercut, so that an annular coiled spring of slightly less normal annular diameter than the groove will be retained against the inner wall, and an annular coiled spring of slightly greater normal diameter than the groove will be retained against the outer wall, the radial width of said groove being such that the springs will be spaced apart when so retained.

3. In means for molding a product having an annular rim with an annular coiled spring therein, a mold having interfitting members with opposed surfaces defining an annular chamber, a portion of said chamber being adapted to retain the annular spring in position against radial movement, and said mold having an annular channel adapted to form on a product made in said mold an annular, outwardly tapered rib extending a uniform distance from the spring.

4. A mold for a diaphragm with a thickened rim comprising an upper member with an annular recess for forming part of said rim, and a coacting lower member with an annular recess concentric with the one in the upper member but of less radial width, leaving shoulders on the line where the upper and lower mold members join, the annular recess in the lower member having a relatively narrow channel formed therein, whereby the molded product will have a rib extending from its rim, intermediate the shoulder portions formed by the shoulders in the mold.

5. A mold member having a dome-shaped central elevation and a plurality of annular grooves surrounding said elevation, said grooves being adapted to receive springs and hold them in position spaced from each other with their center lines in offset planes, one of said grooves having a relatively narrow channel formed in its bottom.

6. In means for molding a product having an annular rim with a pair of annular coiled springs in concentric relation therein, a mold including a member having an annular groove, said groove having its inner and outer walls annularly undercut so that a coiled spring of slightly less normal diameter than the groove will be retained in the undercut portion of the inner wall, and a coiled spring of slightly greater normal diameter than the groove will be retained in the undercut portion of the outer wall, the radial width of said groove being such that the springs will be radially spaced apart when so retained, and said recesses being located so that the springs will be retained with their center lines in offset planes.

7. A semi-finished molded product having an annular rim incorporating a spring extending circumferentially therearound, said rim having shoulders on opposite sides of a cross section, a relatively thin coating of rubber over the spring on one side of said rim between said shoulders, and an annular rib projecting from said thin side intermediate said shoulders.

8. An article of manufacture consisting of a thin central membrane with a thickened peripheral rim, a plurality of annular projections on said rim, each of said projections containing an annular spring, and each having a narrow rib projecting outwardly from the surface of the spring.

9. A semi-finished molded product having a central membrane and a thickened annular rim incorporating a plurality of coiled springs extending circumferentially but in spaced relation therein, said rim having an annular rib of uniform height projecting outwardly therefrom, facilitating the uniform distribution of liquid latex on said rim in the finishing process.

10. The method of making a rubber product which consists of the steps of disposing coiled annular springs in a mold in radially spaced relation in a groove having a narrow channel extending therealong to form a rib on the molded article, filling the mold with rubber, removing the molded product, inverting it, and applying liquid rubber by fountain feed means, to the side of said product formed in said groove, to a thickness represented by the elevation of said rib.

11. The method of making a diaphragm which consists of the steps of placing a spring in a mold in a groove having a narrow channel extending therealong to form a rib on the molded article, filling the mold with rubber, removing the molded product, inverting it, and applying liquid rubber by fountain feed means on each side of the rib, to cover the portion of the spring which lay in the bottom of the groove, using the rib as an indicator of uniform thickness.

12. The method of manufacturing a rubber product which consists of laying springs in annular grooves in a mold, the grooves having channels along the bottom narrower than the springs, closing the mold by means leaving a space connecting the grooves, filling the mold with rubber, whereby a product is made with a rim incorporating said springs, and with projecting ribs formed in said channels, removing the product from the mold, inverting it, and applying liquid latex by fountain feed means to a thickness represented by the tips of the ribs.

13. The method of manufacturing a rubber product which consists of laying springs in concentric annular grooves in a mold, superimposing a coacting mold member which has an open portion bridging said grooves, filling the mold with rubber, whereby a product is made with a rim incorporating said springs, removing the product from the mold, and applying liquid latex to the surfaces formed in said grooves.

14. A mold member having a dome-shaped central elevation and a pair of concentric annular grooves, generally rectangular in cross-section, surrounding said elevation, said grooves having parallel vertical sides, and the planes of the bottoms of said grooves being offset.

CARL C. WATERBURY.